US012006754B2

(12) United States Patent
Soderqvist

(10) Patent No.: US 12,006,754 B2
(45) Date of Patent: Jun. 11, 2024

(54) METHOD FOR TESTING A DOOR OPERATOR

(71) Applicant: Assa Abloy Entrance Systems AB, Landskrona (SE)

(72) Inventor: Sven-Gunnar Soderqvist, Vallakra (SE)

(73) Assignee: Assa Abloy Entrance Systems AB, Landskrona (SE)

(*) Notice: Subject to any disclaimer, the term of this patent is extended or adjusted under 35 U.S.C. 154(b) by 247 days.

(21) Appl. No.: 17/615,182

(22) PCT Filed: Jun. 4, 2020

(86) PCT No.: PCT/EP2020/065464
§ 371 (c)(1),
(2) Date: Nov. 30, 2021

(87) PCT Pub. No.: WO2020/249455
PCT Pub. Date: Dec. 17, 2020

(65) Prior Publication Data

US 2022/0228415 A1 Jul. 21, 2022

(30) Foreign Application Priority Data

Jun. 13, 2019 (SE) .................................. 1930191-0

(51) Int. Cl.
*E05F 15/00* (2015.01)
*E05F 1/10* (2006.01)
*E05F 15/63* (2015.01)

(52) U.S. Cl.
CPC .............. *E05F 15/63* (2015.01); *E05F 1/105* (2013.01); *E05Y 2201/41* (2013.01);
(Continued)

(58) Field of Classification Search
CPC ......... E05F 15/63; E05F 15/616; E05F 15/73; E05F 1/105; E05F 1/10; E05Y 2201/41;
(Continued)

(56) References Cited

U.S. PATENT DOCUMENTS

| | | |
|---|---|---|
| 5,127,190 A | 7/1992 | Hein et al. |
| 5,625,266 A | 4/1997 | Stark |

(Continued)

FOREIGN PATENT DOCUMENTS

| | | |
|---|---|---|
| CN | 109098610 | 12/2018 |
| DE | 4028190 | 3/1992 |

(Continued)

OTHER PUBLICATIONS

Chinese Office Action in 2020800430130, dated Feb. 9, 2023.

(Continued)

*Primary Examiner* — Chi Q Nguyen
(74) *Attorney, Agent, or Firm* — Wissing Miller LLP

(57) ABSTRACT

A method (1000) for testing of a door operator (100), the door operator (100) being configured to via a mechanism (104) move at least one door leaf (200) between a first position and a second position. The door operator (100) includes a first drive unit (102) configured to optionally move the door leaf (200) into said first position and a control unit (103) connected to a sensor (105). The method includes the steps of initiating a simulated powerless mode, measuring operation of the door leaf by the sensor, and comparing measured values of movement with reference values.

13 Claims, 2 Drawing Sheets

(52) U.S. Cl.
CPC ... *E05Y 2201/422* (2013.01); *E05Y 2400/302* (2013.01); *E05Y 2900/134* (2013.01)

(58) Field of Classification Search
CPC ......... E05Y 2201/422; E05Y 2201/315; E05Y 2015/631; E05Y 2400/33; E05Y 2400/456; E05Y 2400/502; E05Y 2400/54; E05Y 2900/134; E05Y 2400/45; E05Y 2900/132; E05Y 2800/113; E05Y 2400/302
See application file for complete search history.

(56) References Cited

U.S. PATENT DOCUMENTS

| | | | | |
|---|---|---|---|---|
| 5,687,507 | A | 11/1997 | Beran | |
| 5,956,249 | A | 9/1999 | Beran et al. | |
| 6,924,730 | B1 | 8/2005 | Evans | |
| 10,480,236 | B2 * | 11/2019 | Söderqvist | E05F 15/63 |
| 10,837,212 | B2 * | 11/2020 | Hucker | E05F 15/63 |
| 11,072,965 | B2 * | 7/2021 | Soderqvist | E05F 15/72 |
| 11,085,222 | B2 * | 8/2021 | Soderqvist | E05F 15/603 |
| 11,162,292 | B2 * | 11/2021 | Soderqvist | E05F 15/603 |
| 11,199,041 | B2 * | 12/2021 | Yulkowski | E05F 15/00 |
| 11,203,893 | B2 * | 12/2021 | Soderqvist | E05F 15/72 |
| 11,230,872 | B2 * | 1/2022 | Paulsson | E05F 15/60 |
| 11,248,410 | B2 * | 2/2022 | Dreyer | E05F 15/603 |
| 11,384,588 | B2 * | 7/2022 | Soderqvist | H02P 29/50 |
| 11,536,075 | B2 * | 12/2022 | Soderqvist | E05F 1/105 |
| 11,697,960 | B2 * | 7/2023 | Soderqvist | E05F 15/63 49/70 |
| 11,735,075 | B2 * | 8/2023 | Lee | G09F 19/04 49/31 |

FOREIGN PATENT DOCUMENTS

| | | |
|---|---|---|
| WO | 2017200906 | 11/2017 |
| WO | 2019051404 | 3/2019 |

OTHER PUBLICATIONS

International Search Report in PCT/EP2019/065464 dated Aug. 21, 2020.
Swedish Search Report in 1930191-0 dated Jan. 17, 2020.

* cited by examiner

METHOD FOR TESTING A DOOR OPERATOR

This application is a 371 of PCT/EP2020/065464, filed on Jun. 4, 2020, published on Dec. 17, 2020, under publication number WO 2020/249455, which claims priority benefits from Swedish Patent Application No. 1930191-0, filed on Jun. 13, 2019, the disclosure of which is incorporated herein by reference.

TECHNICAL FIELD

The present invention relates to the technical field of door operators for swing doors and performance monitoring of door operators. More specifically, the present invention relates to a method for testing the performance of a swing door operator at power off, and to a door operator for performing the method.

PRIOR ART

Door operators are commonly used products that are installed in many different applications in buildings around the world. A typical application could be a hospital where the door operator provides automated opening of swing doors by the push of a button or by activation of a motion sensor for allowing passage of persons and/stretchers etc. through the door opening. A door operator could be configured to open and/or close, and may be configured to hold the door open or closed.

Door operators are subject to a large number of requirements and standards such as e.g. SS-EN 1154, which deals with, among other things, the safety of the device. The requirements may concern the closing speed, closing force, opening force, opening speed, and when it comes to fire safety doors, that the door is closed and latched as intended in case of fire. The requirements apply to the door operator both during normal operating modes and during special circumstances such as during power outages or if there is a fire etc. At least some of these requirements demands regular testing, especially when the door operator is used in a public environment such as a hospital, in order to ensure that the door operator functions as intended under all circumstances.

It is desired to provide a way of improving the safety of a door operator.

SUMMARY

It is therefore an object of the invention to at least partly overcome one or more of the above-identified limitations of the prior art.

According to a first aspect, a method for testing of a door operator is provided. The door operator is configured to via a mechanism move at least one door leaf between a first position and a second position, the door operator comprising a first drive unit configured to optionally move the door leaf into the first position. The door operator further comprises a control unit connected to a sensor. The method comprises initiating a simulated powerless mode, in which the first drive unit will power the movement of the door leaf into the first position and in which the control unit is still electrically connected. The method further comprises measuring by the sensor how the door operator moves the mechanism and the associated at least one door leaf to the first position. Further still, the method comprises comparing the measured values of the movement of the mechanism by means of the control unit with reference values for the movement of the mechanism and the associated door leaf. The door operator is thereby configured to automatically test its performance in a powerless situation, by providing a simulated powerless operating mode. By performing the method to the test the door operator can a technician ensure that the associated door leaf will move as intended during a power outage, without actually having to remove the power from the door operator and manually measuring the movement of the door leaf.

The door operator may comprise an electrically powered second drive unit configured to generate mechanical power to move the door leaf between the first and the second position. The initiation of the simulated powerless mode may include deactivating the second drive unit. The second drive unit will thus be passively rotated under power of the first drive unit, accurately simulating a powerless situation.

Furthermore, the sensor may be an encoder connected to an electric motor of the second drive unit and the encoder measuring the rotation of the electric motor. The passively driven second drive unit and its encoder will thus give the control unit the parameters necessary to determine the movement of the associated door leaf.

In one embodiment, the method comprises a latch check and in which the first position is a closed position of the door leaf. The latch check comprises activating the second drive unit to try to open the door leaf once it has reached its first position, and detecting by the sensor whether the door leaf can be opened by the second drive unit or not. It can thus be automatically determined whether the in the powerless mode the door operator provides sufficient closing force to the door leaf such that the door leaf is properly latched in the door frame. The latching is important as it may be required to meet fire safety regulations.

The method may further performed automatically at predetermined time intervals and/or by manual activation of the test method.

The reference values for movement of the door leaf could according to one embodiment include that the door leaf moves between the first and the second position or vice versa in between 4-10 s. I.e. the door leaf should preferably move at least from a 90° open position to a closed position in between 4-10 s.

In one embodiment, in which the first position is a closed position of the door leaf, the reference values include that the last 10° of movement of the door leaf into the closed position should preferably take at least 1.5 s.

In one embodiment, the method comprises generating an output signal based on the result of the comparison. The output signal may comprise an indication whether the door operator performed in accordance with the requirements or not, and if there was a deviation, how and where this deviation occurred in the movement of the door leaf. The output signal can be interpreted by a technician giving instant information regarding the measures that need to be taken, if any, in order to adjust the powerless movement of the door operator.

According to a second aspect, a door operator is provided. The door operator being configured to via a mechanism move at least one door leaf between a first position and a second position, the door operator comprising a first drive unit configured to optionally move the door leaf into said first position. The door operator further comprising a control unit connected to a sensor. The door operator being configured to perform the method of the first aspect. A door operator which allows automatic performance check of the powerless performance is thus provided, improving the safety and reliability of the door operator.

The door operator may comprise an electrically powered second drive unit configured to generate mechanical power to move the door leaf between the first and the second position, and the initiation of the simulated powerless mode includes deactivating the second drive unit.

The first drive unit may comprise a spring being configured to store energy from the movement of the associated door leaf in one direction optionally useable to subsequently move the door leaf in the opposite direction The powered drive unit may comprise an electric motor, preferably a permanent magnet DC motor configured to power the mechanism to move the associated door leaf. The sensor may further comprise an encoder connected to the electric motor, the encoder measuring the rotation of the electric motor.

Embodiments of the invention are defined by the appended dependent claims and are further explained in the detailed description section as well as in the drawings.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc]" are to be interpreted openly as referring to at least one instance of the element, device, component, means, step, etc., unless explicitly stated otherwise. The steps of any method disclosed herein do not have to be performed in the exact order disclosed, unless explicitly state

BRIEF DESCRIPTION OF THE DRAWINGS

The present invention will be described further below by way of example and with reference to the enclosed drawings. In the drawings.

DETAILED DESCRIPTION OF EMBODIMENTS

Figure 1:
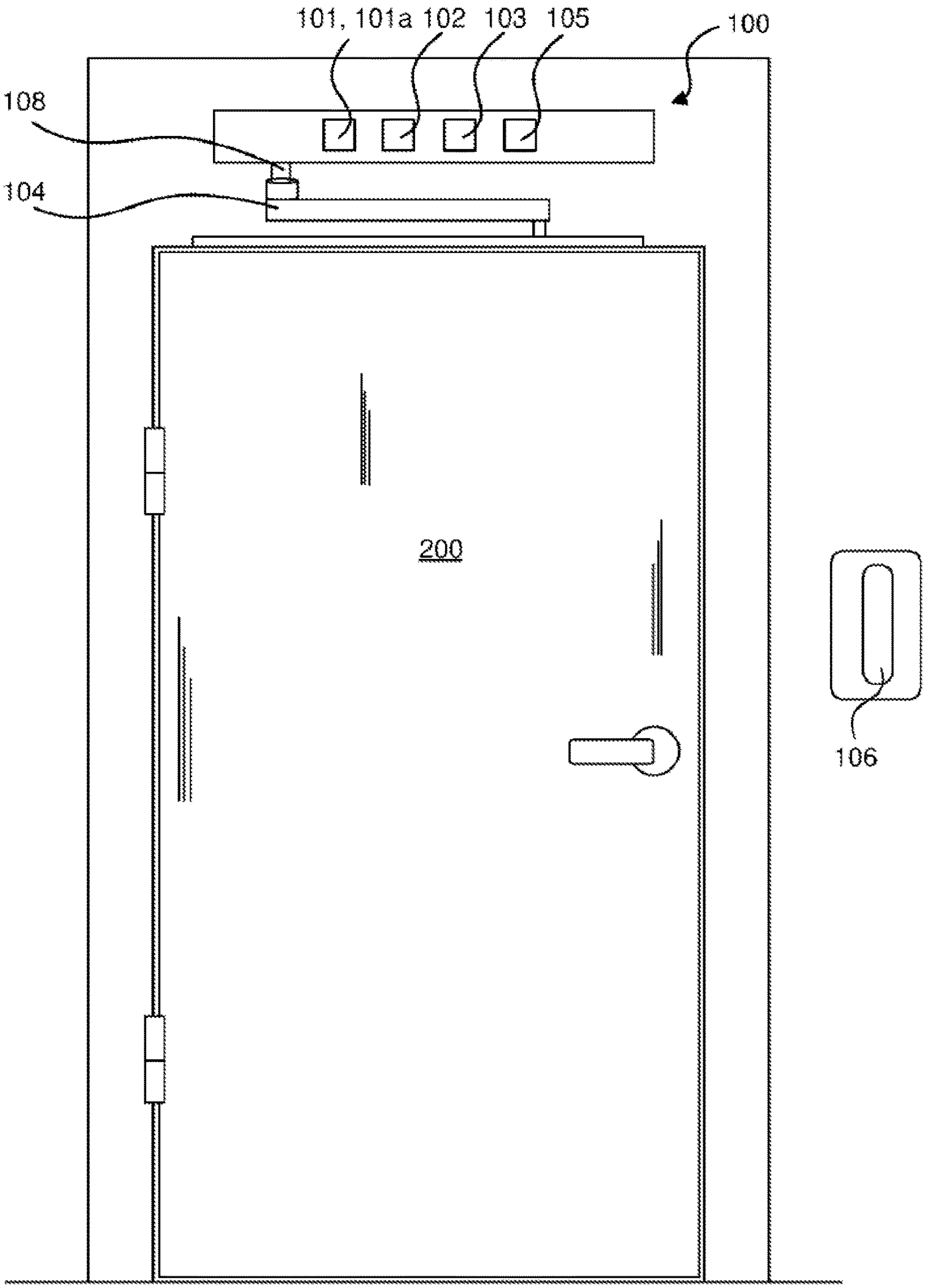
FIG. 1 shows a front view of a door leaf and a door operator according to one embodiment.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

FIG. 1 shows a door leaf 200, here a single door leaf 200 of a swing door type, but the teachings herein may just as well be applied to double swing door leafs 200. The door leaf 200 is hinged at a lateral side to the door frame in a conventional manner. The door leaf 200 may be moved manually or by means of a door operator 100. The door operator 100 may be controlled by means of sensors such as motion detectors, e.g. IR-detectors (not shown), and/or by means of a push button 106. The door operator 100 may be mounted to the wall above the door leaf 200, and attaches to the door leaf 200 by means of a mechanism 104. The door operator 100 may also be of the door mounted type, where the door operator 100 is mounted on the door leaf 200 and being connected to the door frame or wall via the mechanism 104.

The mechanism 104 may comprise one or several arms and/or rails which are moveable by means of the door operator 100 to achieve a corresponding movement of the door 200. Preferably, the mechanism 104 comprises at least one arm connected and rotatable by means of a rotatable output shaft 108 from the door operator 100. The shaft 108 is in turn connected to a first drive unit 102 and, in embodiments comprising a second drive unit 101, also to the second drive unit 101. The teachings herein are not however limited to a specific type of door operator 100, and the skilled person would realize that the door operator itself may embodied in many different forms.

The door leaf 200 is moveable between a first position and a second position and the door operator 100 comprises a first drive unit 102 configured to optionally move the door leaf 200 into the first position. The first drive unit 102 may be a spring biased drive unit 102, which stores energy as the door leaf 200 is brought into the second position. The first drive unit 102 may then use the stored energy to bring the door leaf 200 from the second position to the first position. In a preferred embodiment, the first position is one where the door leaf 200 is closed and the second position is thus an open position of the door leaf 200. This would be the case for instance for a fire door. However, the opposite may be true for doors which needs to be opened for facilitating evacuation. The first position would then be an open position of the door leaf 200, while the second position is a closed position.

The door operator 100 further comprises a control unit 103 connected to a sensor 105. The control unit 103 may be constituted by any suitable central processing unit CPU, microcontroller, Digital Signal Processor DSP, etc., capable of executing computer program code. The control unit 103 may be implemented using instructions that enable hardware functionality, for example, by using executable computer program instructions in a general-purpose or special-purpose processor that may be stored on a computer readable storage medium (disk, memory etc.) also comprised in the door operator 100 and to be executed by such a processor. The control unit 103 may be implemented using any suitable, publically available processor or Programmable Logic Circuit (PLC). The memory may be implemented using any commonly known technology for computer-readable memories such as ROM, RAM, SRAM, DRAM, FLASH, DDR, SDRAM or some other memory technology etc.

The sensor 105 is configured to detect the movement of the door leaf 200, which may be performed by measuring the movement of the door leaf 200 itself, measuring on the mechanism 104 connecting the door operator 100 to the door leaf, or by measuring on components within the door operator 100 itself. Naturally, the door operator 100 may comprise several sensors 105, as would be realized by the skilled person. The sensor 105 may comprise a proximity sensor (e.g. IR, capacitive, inductive, touch switches etc.), a hall sensor, or other types of sensors for detecting position, rotation and/or movement. Also inertia sensors, accelerometers, gyroscopic sensors, force sensors etc. are considered.

Figure 2:
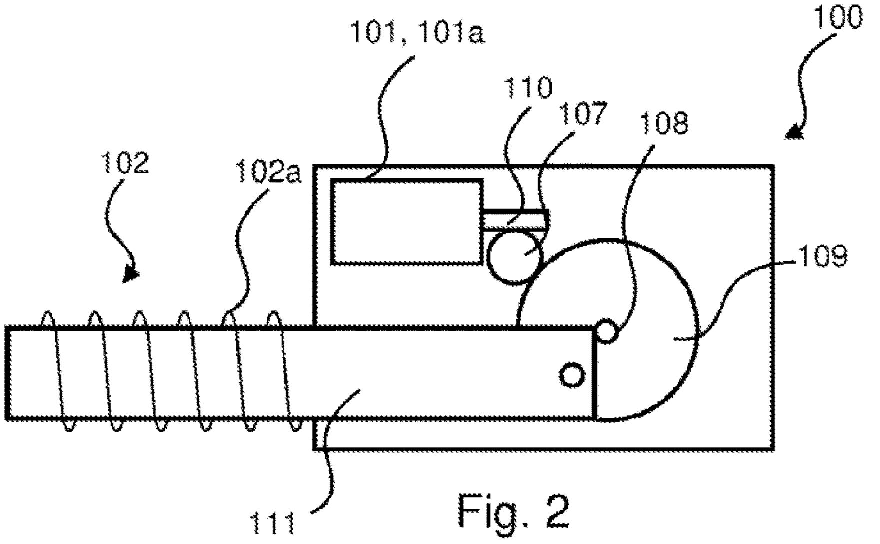
FIG. 2 shows a schematic drawing of a door operator according to one embodiment.

In one preferred embodiment shown in FIG. 2, the door operator 100 comprises a second drive unit 101 which is electrically powered in order to provide automated movement of the door leaf 200. The second drive unit 101 comprises an electric motor 101*a*, preferably a permanent magnet DC motor 101*a* configured to power the mechanism 104 to open and/or close the associated door leaf 200. The electric motor 101*a* may be connected to the mechanism 104 by a number of spur gears 107, levers and/or cam surfaces etc. Preferably, the electric motor 101*a* output shaft 110 powers a worm gear 107. The worm gear 107 is connected via spur gears to the output shaft 108 from the door operator 100, which forms part of the mechanism 104. The output shaft is also connected to a cam mechanism 109. The cam mechanism 109 rotates with the output shaft 108 and pushes on a lever 111 which is connected to the first drive unit 102. When the lever 111 moves will the spring 102*a* of the first drive unit 102 move accordingly. The spring 102*a* of the first drive unit 102 may via the lever 111 and the cam mechanism 109 power the output shaft 108 (i.e. also the mechanism 104). The second drive unit 101 (the electric motor 101*a* thereof) will in such circumstances rotate accordingly. The first drive unit 102 may only power the movement of the mechanism 104 in one direction, while the second drive unit 101 naturally may drive the door leaf 200 in either direction depending on which way the electric motor output shaft 110 is rotated. The first and second drive units 102, 101 will move together regardless of the if the first or second drive unit 102, 101 is powering the movement of the door leaf 200.

The movement of the door leaf 200 may during the normal electrically powered mode be monitored using feedback control, with the control unit 103 constantly monitoring sensor 105 input and controlling the first and/or second drive unit 102, 101 in order to make sure that the correct movement profile is achieved.

However, the door leaf 200 must be closed/opened automatically during certain circumstances. For instance, if there is a fire, it may be required that the door leaf 200 is closed in order to meet fire safety requirements. The door operator 100 must be able to move the door leaf 200 also when there is no electrical power available, i.e. in a powerless mode. The movement of the door leaf 200 in the powerless mode must also meet specific requirements, i.e. the door leaf 200 must not be closed to rapidly or too slowly nor with too high/too low force. It may also be preferred that the door leaf 200 manages to latch securely in the door frame, such that the door leaf 200 is not held in a semi-open position, as this may compromise e.g. fire protection by the door leaf 200.

The first drive unit 102 may power the movement of the door leaf 200 at least during the powerless mode. However, in the powerless mode, the movement of the door leaf 200 cannot be controlled via a feedback loop as the control unit 103 will be unpowered. Instead, the damping/braking of the movement of the door leaf 200 powered by the first drive unit 102 must be preset to achieve the desired movement. The damping/braking preset is generally performed when installing or servicing the door operator 100, as the damping required varies e.g. with type and size of the door leaf 200. In the preferred embodiment, the electric motor 101*a* of the second drive unit 101 provides the damping/braking effect by functioning as a generator, being powered by the closing movement of the door leaf 200 by the first drive unit 102. By varying the electrical resistance that the electric motor 101*a* is subjected to, the amount of damping can be varied. The damping may also be adjusted mechanically, for instance by altering the pretension for the spring 102*a*.

Figure 3:
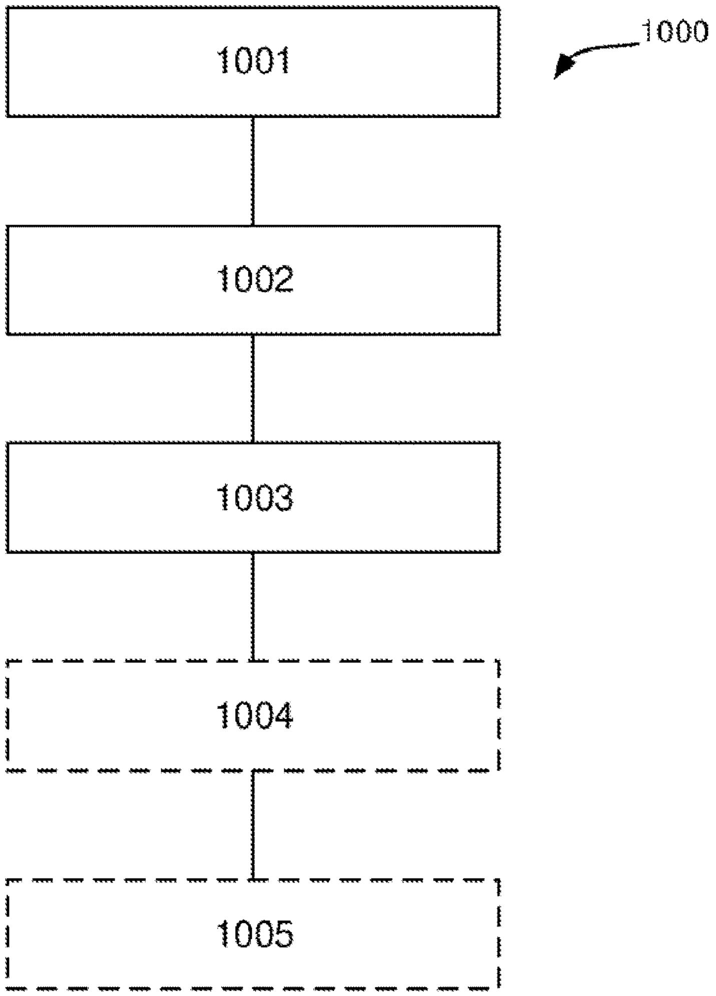
FIG. 3 shows a schematic flowchart of a method for testing a door operator according to one embodiment.

In FIG. 3 is a schematic flow chart shown of a method to test the door operator 100, more specifically its compliance to requirements regarding movement of the door leaf 200 in powerless mode. The method comprises initiating 1001 a simulated powerless mode, in which the first drive unit 102 will power the movement of the door leaf 200 into the first position and in which the control unit 103 is still electrically connected. The sensor 105 measures 1002 how the door operator 100 moves the mechanism 104 and the associated at least one door leaf 200 to the first position. The measured values describing the movement of the mechanism 104 are then compared 1003 by means of the control unit 103 with reference values, which are discussed below, for the movement of the mechanism 104 and the associated door leaf 200.

The method may either be initiated by a technician or be performed entirely automatically. For instance, the method may be performed at certain time intervals.

In case the measured values deviates from the acceptable required values for the movement of the door, the door operator 100 may be configured to generate 1005 an output signal based on the result of the comparison 1003. The output signal can be interpreted by a technician and indicates that service is necessary, and how the door operator 100 induced movement of the door leaf 200 deviates from the intended movement. The output signal may be generated via a relay to a billing automation system. The output signal may also be embodied as a wireless RF signal, such as WIFI, Bluetooth etc.

In the preferred embodiment, the door operator 100 comprises an electrically powered second drive unit 101 configured to generate mechanical power to move the door leaf between the first and the second position. The initiation 1001 of the simulated powerless mode may include deactivating the second drive unit 101, thus disallowing that it is used to actively control the movement of the mechanism 104 and the door leaf 200 via feedback control. The sensor 105 may as mentioned be embodied as an encoder 105 connected to an electric motor 101*a* of the second drive unit 101 and the sensor 105 measures the rotation of the electric motor 101*a* in order to determine how the door leaf 200 moves into the first position, solely powered by the first drive unit 102.

In one embodiment, the method further comprises a latch check 1004. The latch check activates the second drive unit 101 to try to open the door leaf 200 once it has reached its first position, where the first position is the closed position of the door leaf 200. The sensor 105 detects whether the door leaf 200 can be opened by the second drive unit 101 or not The reference values for the movement of the door leaf 200 should preferably include at least that the door leaf 200 moves between the open and the closed position or vice versa in between 4-10 s. Even more preferably, between a 90° open position and a closed position in 4-10 s. The reference values may also include that the last 10° of movement of the door leaf 200 into the closed position should preferably take at least 1.5 s.

It should be mentioned that the inventive concept is by no means limited to the embodiments described herein, and several modifications are feasible without departing from the scope of the appended claims. In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for testing of a door operator, said door operator being configured to via a mechanism move at least one door leaf between a first position and a second position, the door operator comprising a first drive unit configured to move the door leaf into said first position, said door operator further comprising a control unit connected to a sensor, the method comprising:

initiating simulated powerless mode, wherein the first drive unit powers a movement of the door leaf into the first position and wherein the control unit remains electrically connected, measuring by the sensor how the door operator moves the mechanism and the door leaf to the first position, and comparing measured values of the movement of the mechanism by means of the control unit with reference values for the movement of the mechanism and the door leaf.

2. The method for testing a door operator according to claim 1, wherein the door operator comprises an electrically powered second drive unit configured to generate mechanical power to move the door leaf between the first and the second positions, and wherein the initiation of the simulated powerless mode includes deactivating the second drive unit.

3. The method for testing a door operator according to claim 2, wherein the sensor is an encoder connected to an electric motor of the second drive unit and wherein the encoder measures the rotation of the electric motor.

4. The method for testing a door operator according to claim 2, the method further comprising a latch check, wherein the first position is a closed position of the door leaf, comprising activating the second drive unit to try to open the door leaf once the door leaf has reached its first position, and detecting by the sensor whether the door leaf can be opened by the second drive unit or not.

5. The method for testing a door operator according to claim 1, wherein the method is performed automatically at predetermined time intervals and/or by manual activation of the test method.

6. The method for testing a door operator according to claim 1, wherein the reference values include that the door leaf moves from the first to the second position or from the second to the first position in 4-10 seconds.

7. The method for testing a door operator according to claim 1, wherein the first position is a closed position of the door leaf, and wherein the reference values include that a time to complete a last 10° of movement of the door leaf into the closed position is greater than about 1.5 seconds.

8. The method for testing a door operator according to claim 1, further comprising generating an output signal based on the result of the comparison.

9. A door operator, said door operator being configured to via a mechanism move the at least one door leaf between the first position and the second position, the door operator comprising the first drive unit configured to move the door leaf into said first position, said door operator further comprising the control unit connected to the sensor, wherein said door operator being configured to perform the method according to claim 1.

10. The door operator according to claim 9, further comprising an electrically powered second drive unit configured to generate mechanical power to move the door leaf between the first and the second position, and wherein the initiation of the simulated powerless mode includes deactivating the second drive unit.

11. The door operator according to claim 10, wherein the powered second drive unit comprises an electric motor, comprising a permanent magnet DC motor configured to power the mechanism to move the associated door leaf.

12. The door operator according to claim 11, wherein the sensor comprises an encoder connected to the electric motor, the encoder measuring the rotation of the electric motor.

13. The door operator according to claim 9, wherein the first drive unit comprises a spring being configured to store energy from the movement of the associated door leaf in one direction useable to subsequently move the door leaf in an opposite direction.

* * * * *